United States Patent [19] [11] 3,725,588
Loomis [45] Apr. 3, 1973

[54] TELEPHONE STATION CONNECTION SYSTEM

[75] Inventor: Donald C. Loomis, Upper Moreland Township, Montgomery County, Pa.

[73] Assignee: Sola Basic Industries, Inc., Milwaukee, Wis.

[22] Filed: Aug. 9, 1971

[21] Appl. No.: 169,917

[52] U.S. Cl. ....................179/5 R
[51] Int. Cl. ....................H04m 11/04
[58] Field of Search ....................179/2 DP, 2 A, 5 R, 5 P

[56] References Cited

UNITED STATES PATENTS 3,582,555 6/1971 Kok ....................179/5 R

*Primary Examiner*—Ralph D. Blakeslee
*Attorney*—Charles T. Jacobs

[57] ABSTRACT

Disclosed is a telephone station adapted for communication through a telephone line and an exchange with a second station at which there will be repetitively superimposed on the communication a signal of predetermined frequency. At the first station there is provided automatic dialing apparatus available for operation to dial the second station, as an incident to which operation the first station will be connected across the line and there will be started an initial operation of a timer. A superseding operation of the timer will be started an an incident to the first station receiving a signal of the predetermined frequency, whereas in response to an unsuperseded operation of the timer the conductive connection abovementioned will be terminated.

6 Claims, 1 Drawing Figure

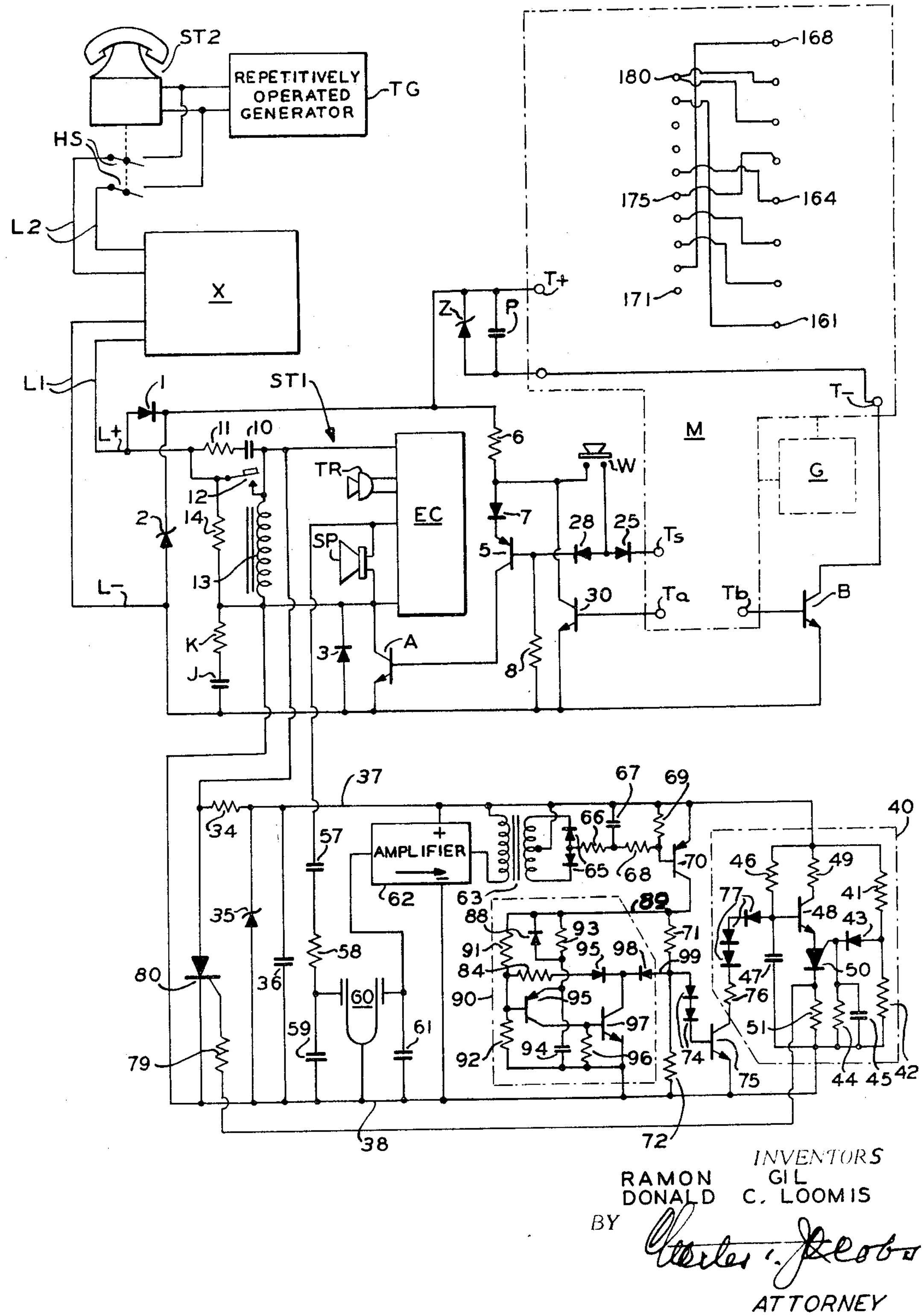
INVENTORS
RAMON GIL
DONALD C. LOOMIS
BY [signature]
ATTORNEY

TELEPHONE STATION CONNECTION SYSTEM

This invention relates to telephone systems. It more particularly relates to a telephone station which is adapted for communication with another station through a telephone line and an exchange, and which is provided with automatic dialing apparatus by which that other station may be dialed. It is especially concerned with the functions of appropriately effecting and terminating conductive connection of the station across the line, without action by the using party other than that which invokes the operation of the automatic dialing apparatus; it accordingly lends itself well to use with station which, once placed in operation for a communication therefrom, require in connection with that communication no further manipulation by the user. While not in all aspects limited thereto, the invention is of especial utility for use with stations intended for the reporting of emergencies to a predetermined call-receiving station.

The invention contemplates that during the communication with the cell-receiving station there will at that station be repetitively superimposed on the communication a signal of predetermined frequency. According to an important aspect of the invention there will be provided at the calling station (1) automatic dialing apparatus operable to dial the call-receiving station, (2) means rendered effective as an incident to operation of that apparatus for effecting a conductive connection of the calling station across the line, (3) a timer of which an initial operation is started as an incident to the effecting of that conductive connection, (4) means, rendered effective as an incident to the receipt at the calling station of a signal of the predetermined frequency, for starting a superseding operation of the timer, and (5) means responsive to an unsuperseded operation of the timer for terminating the conductive connection.

Other features and aspects of the invention will appear from the following detailed description and the appended claims.

In that description reference is had to the accompanying drawing, whose single FIGURE 1 schematically illustrates the calling station, exchange and called station and, at the calling station, an embodiment of the invention.

In FIG. 1 a telephone station to be called is schematically illustrated as ST2; it may be connected, when its hook switch HS is closed, to an exchange X by a line L2. Locally associated with station ST2 are certain arrangements which are described hereinafter, following some description of a typical station from which ST2 may be called.

The main portion of FIG. 1 — lying below and to the right of X — illustrates a station ST1 by which station ST2 may be called and thereafter communicated with through the exchange X, to which station ST1 may be connected through the line L1; it also illustrates arrangements especially associated with ST1. Station ST1 may comprise the elements TR, SP and EC — TR being a transmitter or microphone, SP a speaker or receiver, and EC electrical circuitry to which TR and SP are connected and which with those two elements makes up the speech-handling portion of the station. In their simplest form these three elements might be the microphone, receiver and network of a relatively simple station; in a typical more elaborate form they may be the transmitter, speaker and network-and-amplifier portions of a relatively sophisticated station adapted for hands-free operation. In either event these three elements may leave to be performed by other apparatus the functions of making and terminating the required conductive connection of the station ST1 to the line L1, and of automatic dialing from ST1 to another station, such as ST2, for communication with which the station ST1 may be specially intended. Those functions are among those performed by the associated apparatus.

Telephone line L1, comprising the conductors L+ and L− between which a potential difference is impressed at the exchange X, may lead to the station ST1 from the exchange. One side (e.g. the lower-shown) of the circuitry EC and thus of ST1 may be conductively connected to conductor L− through the collector-emitter path of a normally conductive n-p-n transistor A (which is preferably shunted by a reversely poled diode 3). The other side of that circuitry and thus of ST1 may be connected to the conductor L+ through two paths in parallel with each other; one of those paths may comprise a normally open switch 12, and the other may comprise a serially arranged capacitor 10 and resistor 11.

With the station ST1 there is associated automatic dialing apparatus, which may include the transistor A just mentioned and the apparatus appearing in the upper righthand portion of FIG. 1 (i.e. generally to the right of and/or above EC). This is shown by way of example in the form of a simplified schematic illustration of subject matter detailedly shown in FIG. 2 of the copending application of Donald V. DiMassimo, Ser. No. 819,819 filed Apr. 28, 1969, whose identifying symbols have been re-used in FIG. 1 hereof where applicable. Such illustration includes a signal generator G, and an electrically energizable control means M with which the signal generator is connected and which is actuable to cause the generation by G of signalling, preprogrammed within M, appropriate to the dialing of a predetermined telephone address — typically that of the station ST2.

In arranging for the normally conductive state of transistor A its base may be supplied with current from the collector of a p-n-p transistor 5, which in turn is supplied with emitter current from conductor L+ through a diode 1, a resistor 6, and a diode 7; the two transistors 5 and A will be jointly conductive or non-conductive, and the task of rendering A non-conductive at certain times may be performed by then diverting current from the emitter of transistor 5. In FIG. 2 of the copending application above referred to arrangements for accomplishing such diversion were shown within the control means M; in FIG. 1 of this application the essential elements of those diverting arrangements, together with the actuating means for M, have for clarity been shifted to and are shown outside of M. Those elements comprise (a) an n-p-n transistor 30 whose collector is connected to the junction between resistor 6 and diode 7 and whose emitter is connected to conductor L−, and (b) an openly-biased switch W one terminal of which is connected to the junction just mentioned and whose other terminal is connected (i) to the transistor-5 base, from which a resistor 8 is connected to L−, through a diode 28, and (ii) to a Start terminal $T_s$ on control means M through a diode 25. Transistor 30 is under the control of a terminal $T_a$, on control means M, to which its base is connected.

The control means M is provided with a pair of energy-input terminals T+ and T−, shunted by a capacitor P and a Zener diode Z, and is energized by the supply of direct current to those terminals from L+L−. For this purpose T+ may be connected to conductor L+ through the diode 1 (a relatively high-voltage Zener diode 2 preferably being shunted from T+ to L− to guard against the imposition of excessive transients from L+L− onto M); T− may be connected to conductor L− through the collector-emitter path of a normally non-conductive n-p-n transistor B. Transistor B is in turn under the control of a terminal $T_b$, on control means M, to which its base is connected and by which it may be rendered conductive at certain times.

The period during which the control means M is energized, and during which the states of transistors A and B are altered as hereinafter set forth, may be termed the dialing period; it comprises the duration of the series of signals to be impressed on L+L− and the non-signal intervals between the successive signals, and in the embodiment under description it is postulated also to include an initial non-signal interval preceding the first of the signals. The dialing period will be initiated by a temporary closure of switch W — i.e. closure for several milliseconds or more — which renders positive (relative to L−) the start terminal $T_s$ on the control means M and thereby energizes M as hereinafter reverted to.

At the initiation of closure of switch W the terminal $T_b$ on the control means will, through circuitry within M, forthwith be rendered positive (relative to L−) and transistor B will therefore be rendered conductive. Also forthwith transistor A will be rendered non-conductive initially (i.e. during the switch-W closure) by the diversion of transistor-5 emitter current through switch W and diode 28 and resistor 8 to L−, and thereafter by diversion of that current to L- through the collector-emitter path of transistor 30, which is then conductive as a result of $T_a$ having been rendered positive (relative to L−)through circuitry within M.

Transistor B, in the conductive state in which it is placed at the beginning of the dialing period, constitutes a means effecting a low-resistance current-conducting connection of the energy-input terminals T+ and T− across L+L− and accordingly it causes, after the few milliseconds required for substantial charging of capacitor P, the energization of the control means M. Assuming the closure of W to have been continued for at least that long the control-means energization will be maintained, without any requirement for continuance of closure of W, throughout the dialing period; this maintenance during the non-signal intervals will be from the line through the then-conductive transistor B, and during the signals (when B's conductivity is interrupted as set forth in the next succeeding paragraph) will be by energy stored during the intervals in capacitor P.

During the dialing period the circuitry EC, and thus the station ST1, provides no d.c. loading of the line L1; this is so because of the then-non-conductive state of transistor A, and would independently be so by reason of switch 12 still remaining in its normally-open condition. The energization of control means M from L+L− through transistor B during the non-signal intervals within that period serves during those intervals to provide a substitute loading of L+L−. During the signals the control means (then energized from P) removes positive potential from $T_b$, and the resulting non-conductivity of transistor B serves then to interrupt that substitute loading — it being by such interruptions that, in the FIG.-1 circuit, there is imposed on L+L− a coded series of spaced signals preprogrammed within M. At the conclusion of the dialing period circuitry within M causes $T_a$ and $T_b$ to lose their positive potentials; transistor A resumes its normally-conductive state, transistor B resumes its normally non-conductive state, and control means M returns to its unenergized state.

For the preprogramming of the coded series of spaced signals there have been shown within M a group of eight terminals 161 through 168 respectively allocated to eight successive address digits, and a group of ten terminals 171 through 180 respectively allocated to the progressive numbers from one through ten; suitable interconnections between the two groups accomplish the preprogramming — for example, the interconnections shown in FIG. 1 will preprogram the telephone address 93465002. Complete details of such preprogramming arrangements — and of all other portions of a typical control means M — have been disclosed in the copending application above referred to and need not here be repeated.

As an incident to operation of the automatic dialing apparatus — for example in response to the completion of that operation — there may be effected a conductive connection of circuitry EC and thus of station ST1 across the line L1. Such a connection of the lower side of EC to conductor L− is of course then effected through the transistor A, which has been seen above to resume a conductive state at the end of the dialing period; such a connection of the upper side of EC to conductor L+ may be then effected by the closure of the switch 12.

For effecting and appropriately maintaining that switch closure a coil 13 may be associated with the switch to form a relay. The coil 13 may be connected from the 10–12 junction to the collector of transistor A (i.e. across the circuitry EC) so that the coil will be energized when switch 12 is closed and transistor A is conductive — and in turn while energized the coil will maintain switch 12 closed. Across the serial combination of 11, 10 and 13 there may be shunted a resistor 14, of value high relative to that of 11, which will discharge capacitor 10 as an incident to transistor A going non-conductive at the beginning of the dialing period — but at a rate too slow for an effective energization of the coil 13 at that time. On the other hand the recharging of capacitor 10 incident to transistor A resuming conductivity at the end of the dialing period is made rapid enough, by sufficiently low value of 11, for an impulsive coil-13 energization effective to throw switch 12 to closed condition — after which coil energization and switch closure will be maintained until that energization is interrupted, and while maintained will keep EC and thus ST1 conductively connected across the line.

It is intended that shortly following the end of a communication with the callable station ST2 by the calling station ST1 — or by any other of a plurality of calling stations of which ST1 is an example — there be effected a disconnection of the calling station from across its respective line. This purpose is achieved by the use of appropriate arrangements respectively at the callable station and at each of the calling stations. At the callable station ST2 such arrangements may serve during a communication with that station to repetitively superimpose (for example, at a 6-per-minute rate, i.e. with a 10-second period of recurrence), on that station's line L2 and thus on the communication, a short (e.g. 100-millisecond) signal of predetermined frequency; means for effecting such repetitive superimposition at station ST2 is illustrated in FIG. 1 as a tone generator TG recurrently operative in the stated manner so long as that station is in use. At each calling station, e.g. at ST1, such arrangements may serve to interrupt the energization of coil 13 — thereby terminating the conductive connection of circuitry EC and thus of the station across the line L1 — in response to a sufficiently continued absence of receipt of such signal at that calling station.

Such arrangements for station ST1 are illustrated in the lower portion of FIG. 1. They may comprise (i) a timer 40 of which an initial operation is started as an incident to the effecting of a conductive connection of station ST1 across line L1, (ii) control means, rendered effective as an incident to the receipt at ST1 of a signal of the predetermined frequency, for starting a superseding operation of the timer for a period greater than the period of recurrence of the signal, and (iii) means responsive to an unsuperseded operation of the timer for interrupting the energization of the coil 13. Energy of stablized voltage may be supplied to these elements through positive and negative conductors 37 and 38 respectively, from across the parallel combination of a Zener diode 35 and capacitor 36 — to which energy is supplied, while switch 12 is closed, from across the coil 13 through a series resistor 34.

The timer 40 may typically be made up of (a) a reference-voltage-establishing circuit, (b) a timing circuit and (c) sensing means interconnected between those circuits. The reference-voltage establishing circuit may comprise two resistors 41 and 42 serially connected from conductor 37 to conductor 38, with a diode 43 and resistor 44 (the latter preferably shunted by a modest-valued capacitor 45) serially connected from the 41–42 junction to conductor 38. The timing circuit may comprise a timing resistor 46 and a timing capacitor 47 serially connected from conductor 37 to conductor 38. The sensing means may comprise a programmable-unijunction device 50 to whose anode the 46–47 junction is connected through the base-emitter path of an n-p-n transistor 48, whose gate is connected to the 43–44 junction and whose cathode is connected to the conductor 38 through a relatively low-valued resistor 51; the collector of the transistor 48 may be connected to the conductor 37 through a resistor 49.

Quiescently, or in the absence of conductive connection of station ST1 across the line L1, there will be no potential difference or voltage between conductors 37 and 38, and the timing capacitor 47 will stand discharged. When the station becomes connected across the line a voltage determined by the Zener diode 35 will appear between 37 and 38, and a predetermined fraction of that voltage will appear across resistor 44; coincidentally the timing capacitor will begin charging through timing resistor 46, the timer thus being brought into initial operation.

Operation of the timer, if not interfered with, will comprise the continuance of the charging of the timing capacitor 47 until the voltage across it has risen sufficiently above that across resistor 44 so that there will be initiated a current flow through the base-emitter path of transistor 48; that flow, amplified by the addition of a transistor-48 collector-emitter current which that flow occasions, will pass through the anode-to-gate path of the device 50, firing that device and thereby resulting in the discharge of the timing capacitor through 48, 50 and 51 — which discharge constitutes completion of an operation of timer 40.

It is arranged that upon the receipt at station ST1 of a signal of the predetermined frequency above referred to while an operation of the timer 40 is under way, there will be started a superseding operation of that timer — i.e. an operation which takes the place of, and thereby annuls, that previously-under-way operation — and it is to accomplish this that there is provided the control means above referred to. That means may begin with a sharply tuned piezo-electric tuning-fork filter 60 whose input (shunted by an appropriate small capacitor 59) may be connected through a resistor 58 and blocking a capacitor 57 across the speaker or receiver SP, and across whose output (shunted by an appropriate small capacitor 61) may be connected the input of an a.c. amplifier 62 (whose energizing terminals may be connected across 37–38). Output oscillations from amplifier 62 may be applied to the primary of a transformer 63 which has a secondary whose center-tap is connected to conductor 37; the extremities of that secondary may be connected through respective diodes 65 and a common resistor 66 to one terminal of a capacitor 67 whose other terminal may be connected to conductor 37. Resistors 68 and 69 in series with each other may be connected across capacitor 67.

The 68–69 junction may be connected to the base of a p-n-p transistor 70 whose emitter is connected to the conductor 37; the collector of transistor 70 may be connected through two serial resistors 71 and 72 to the conductor 38, and across the lower resistor 72 there may be serially connected two diodes 74 and the base-emitter path of an n-p-n transistor 75. (Optional apparatus shown as connected across the upper resistor 71, hereinafter described, will for the present be assumed absent.) To the collector of the transistor 75, from the timing-circuit junction 46–47, there may be connected a capacitor-discharge circuit comprising a low-valued resistor 76 as well as diodes 77 hereinafter mentioned.

During the receipt at station ST1 of a signal of the predetermined frequency, oscillations of that frequency will be passed by the filter 60 to the amplifier 62 and, after amplification by the latter, will be rectified to result in the impression of a voltage across the capacitor 67 and the flow of a base current in the transistor 70; this will render that transistor then conductive; which in turn will render conductive transistor 75. The conductivity of 75 will result in discharge of the timing capacitor 47 and thus in annulment of the timer's operation then under way. At the conclusion of the signal a re-charging of the capacitor, and thus a superseding operation of the timer, will be started; this results from the cessation of conductivity of transistors 70 and 75 occurring at that conclusion.

The timing period for which each superseding (as distinguished from initial) operation of the timer 40 is started is desirably somewhat longer than the period of recurrence of the predetermined-frequency signals — e.g. if that period be 10 seconds, the timing period may be 15 seconds. For reasons hereinafter mentioned the timing period for which an initial operation of the timer is stated (a timing period determined essentially by the values of 41, 42, 46 and 47) is preferably made appreciably longer — and if the conductivity of transistor 75 invoked by the signal were fully to discharge capacitor 47, then the period for which each superseding operation would be started would also be that longer period. In order that it be only the shorter one such as first mentioned in this paragraph, the discharge of capacitor 47 by transistor 75 may be kept less than complete — it being for this purpose that there are included an appropriate number of diodes 77.

The means responsive to an unsuperseded operation of the timer 40 (i.e. to discharge of 47 through 48, 50 and 51) for interrupting the energization of the coil 13 may be an SCR 80 whose cathode may be connected to conductor 38 and thus to the negative extremity of 13, and whose anode may be connected to the other extremity of that coil. The gate of the SCR may be connected through a resistor 79 to the cathode of the device 50, so that upon the firing of that device the voltage pulse developed across resistor 51 will result in a gate current which will fire the SCR. The SCR firing will short the coil 13, permitting the switch 12 to resume its normally open state and thus terminating the conductive connection of the station STI across the line L1. That termination will leave the coil 13 unenergized, the SCR extinguished and the control means 57–77 and timer 40 unenergized.

In a typical operation of the illustrated system, for example by a calling party at station ST1 wishing to report on emergency to station ST2, that party will briefly close the switch W; that, as above described, will actuate ST1's automatic dialing apparatus, which during the thus-initiated dialing period will dial the station ST2 (for which that dialing apparatus has been preprogrammed). During this period station ST1 will remain conductively disconnected from line L1 at switch 12 as well as at the temporarily-non-conductive transistor A, but the calling party may nevertheless be enabled to hear the sounds attendant on dialing; this may be done by shunting a serially arranged capacitor J and resistor K across the collector-emitter path of that transistor, thereby providing an a.c. path across A analogous to that already present (in the form of 10 and 11) across 12. At the conclusion of the dialing period, as already made apparent, the coil 13 will close and hold closed the switch 12 and the transistor A will resume its normally conductive state; this effects a conductive connection of station ST1 across the line, as an incident to which an initial operation of the timer 40 is started.

Also at the conclusion of the dialing period there will have been started a series of actions which normally will comprise the establishment (through the exchange) of a connection between stations ST1 and ST2, ringing at ST2, and answering (e.g. hook-switch closure or equivalent) at ST2. It is to allow a reasonable time for these actions — and for the interval between such answering and the first succeeding signal superimposition at ST2, which might be of any length up to the abovementioned period of signal recurrence — that the timing period for which an initial operation of timer 40 is started is preferably established at appreciably more than for any superseding operation.

Of course, any value at which it is established may turn out in an occasional instance to be insufficient, thanks for example to a busy condition of line L2, abnormally slow answering at ST2 or the like; in such an instance the initial timer operation, not being superseded, will run to conclusion, whereupon the conductive connection of ST1 to the line will be terminated without the attempted communication with ST2 having been accomplished. During this series of actions, however, station ST1 will have been conductively connected across the line and the calling party will have been able, through what he hears, to discern what has happened to his attempted call, the time at which it has become possible for him to re-attempt it, etc.

In the normal instance both the answering and the first succeeding signal superimposition at ST2 will occur before a conclusion of the initial operation of the timer. In response to the receipt of that signal at ST1 the resulting conductivity of the transistor 75 will, as above set forth, effect a partial discharge of the timing capacitor 47, thereby starting a superseding operation of the timer. The period for which that superseding operation is started is longer than the period of recurrence of the signal; accordingly so long as the communication between ST1 and ST2 is maintained each superseding operation will in turn be superseded by another. But when such communication is terminated at ST2 — e.g. when the hook switch HS is opened — there is foreclosed the further receipt of the signal at ST1; the timer operation under way at the time of such termination will not be superseded, and at its conclusion the SCR will be fired and the conductive connection of ST1 across L1 terminated, as above set forth.

The system as thus described, employing a signal of frequency of the order of 2750 Hz., has proven thoroughly satisfactory in use, in both pulse-dialing and tone-dialing applications, excepting for one problem which has been encountered in some (but by no means all) pulse-dialing cases. This problem, in the cases where encountered, has arisen because (a) dial tone, following termination at ST2 of the communication, has re-appeared on the line before the termination at ST1 of the conductive connection, and (b) that tone (which in pulse-dialing areas is frequently imprecisely constituted) has happened to contain a component of or very close to the predetermined frequency. In such cases that component may be sufficiently strong to result in a sustained conductivity of transistors 70 and 75, and thus in a sustained suspension of operation of the timer 40; although the dial tone may ultimately be superseded by a "receiver-off-hook" advisory tone, the latter is usually much stronger still and is very likely itself to contain a component sufficient to sustain the suspension — which might therefore go on indefinitely. It is to cope with this problem, when encountered or likely to be encountered, that there has been shown the optional apparatus above noted.

This apparatus may comprise a timer 90 having an input conductor 89 connected to the 70–71 junction and an output conductor 99 connected to the 71–72 junction. Between conductors 89 and 38 there may be connected within the timer a reference-voltage-establishing circuit serially comprising resistors 91 and 92, and a timing circuit serially comprising timing resistor 93 (preferably shunted by a reversely poled diode 88) and timing capacitor 94. Between the 93–94 and 91–92 junctions there may be connected the emitter-base path of a p-n-p transistor 95 whose collector may be connected to the conductor 38 through the base-emitter path (preferably shunted by a resistor 96) of an n-p-n transistor 97. The output conductor 99 may be connected through a diode 98 to the collector of transistor 97; preferably a resistor 84 and diode 95 in series with each other will be bridged from the 91–92 junction to the collector of 97.

Quiescently (i.e. with no voltage between conductors 37 and 38) there will be no voltage across resistors 71 and 72, and timing capacitor 94 will stand discharged; the same state of affairs will persist, even after there is voltage between 37 and 38, until a signal of predetermined frequency reaches the amplifier 62 and results in conductivity of transistor 70 — whereupon a voltage will appear across 71–72 and the timing capacitor 94 will start charging. The values of components 91 through 94 are so chosen that the charge accumulated by 94 during the normal duration (e.g. 100 milliseconds) of the predetermined-frequency signal will be insufficient to cause any further action of the timer 90 — and when the voltage across 71–72 disappears at the end of such a signal capacitor 94 will quickly discharge through 88–71–72.

Those values will, however, be chosen so that if the charging of the timing capacitor 94 proceeds for a time exceeding a preselected duration which is itself greater than (for example about twice) the normal duration of a predetermined-frequency signal, then there will be precluded by the timer 90 any annulment of the operation of the timer 40 then under way — which operation will accordingly proceed to its completion, with attendant termination of the conductive connection of station ST1 to the line. Thus when a post-connection tone such as above referred to has caused the capacitor 94 to charge for more than the preselected duration the transistor 95 will begin to conduct, this will render transistor 97 conductive, and in turn that will draw current through 84–95 to regenerate the action and thus to result in both transistors remaining conductive so long as the sustained tone persists; while transistor 97 remains conductive it and diode 98 will fully divert current from diodes 74 and the base-emitter path of transistor 75, thus precluding any interference by 75 with a normal completion of operation of the timer 40.

While we have shown and described our invention in terms of a particular embodiment thereof, we intend thereby no unnecessary limitations. Modifications in many respects will be suggested by our disclosure to those skilled in the art, and such modifications will not necessarily constitute departures from the spirit of the invention or from its scope, which we undertake to define in the following claims.

We claim:

1. The combination, with a telephone station adapted for communication through a telephone line and an exchange with another station at which there is repetitively superimposed on the communication a short signal of predetermined frequency, of (1) automatic dialing apparatus operable to dial said other station, (2) means rendered effective as an incident to operation of said dialing apparatus for effecting a conductive connection of said firstmentioned station across the line, (3) a timer of which an initial operation is started as an incident to an effecting of such conductive connection, (4) means, rendered effective as an incident to each repetitive receipt at said firstmentioned station of said superimposed signal, for starting a superseding operation of said timer, and (5) means responsive to an unsuperseded operation of said timer for terminating said conductive connection.

2. The subject matter claimed in claim 1 wherein said element identified as (2) comprises means responsive to the conclusion of operation of said dialing apparatus for effecting a conductive connection of said firstmentioned station across the line.

3. The subject matter claimed in claim 1 wherein said element identified as (4) comprises means, responsive to the conclusion of each said superimposed signal received at said firstmentioned station, for starting a superseding operation of said timer.

4. The subject matter claimed in claim 1 further including means connected with said timer for causing the interval for which each superseding operation thereof is started to be substantially less than that for which said initial operation thereof is started.

5. The subject matter claimed in claim 1 wherein said element identified as (2) comprises a normally open switch closeable to effect said conductive connection, a coil energizable through said switch when closed and which while energized maintains said switch closed, and means in shunt to said switch for effecting an impulsive energization of said coil.

6. The subject matter claimed in claim 5 wherein said means for terminating said conductive connection comprises means responsive to an unsuperseded operation of said timer for transiently shorting said coil.

* * * * *

UNITED STATES PATENT OFFICE

CERTIFICATE OF CORRECTION

Patent No. 3,725,588 Dated April 3, 1973

Inventor(s) Ramon Gil and Donald C. Loomis

It is certified that error appears in the above-identified patent and that said Letters Patent are hereby corrected as shown below:

Patent Front Page, [75], before "Donald C. Loomis" insert --Ramon Gil, Fair Lawn, Bergen County, New Jersey--.

Signed and sealed this 9th day of April 1974.

(SEAL)
Attest:

EDWARD M.FLETCHER,JR.
Attesting Officer

C. MARSHALL DANN
Commissioner of Patents